United States Patent [19]

Bloomfield

[11] Patent Number: 5,384,911
[45] Date of Patent: Jan. 24, 1995

[54] METHOD OF TRANSFERRING PROGRAMS FROM ACTION ORIENTED GUI PARADIGM TO OBJECT ORIENTED GUI PARADIGM

[75] Inventor: Marc A. Bloomfield, Lighthouse Point, Fla.

[73] Assignee: International Business Machines Corporation, Armonk, N.Y.

[21] Appl. No.: 240,398

[22] Filed: May 10, 1994

Related U.S. Application Data

[63] Continuation of Ser. No. 996,422, Dec. 23, 1992, abandoned.

[51] Int. Cl.6 .......................... G06F 3/14; G06F 3/153
[52] U.S. Cl. .................................... 395/157; 395/159; 395/161
[58] Field of Search ................ 395/144, 145, 157, 159, 395/160, 161, 155

[56] References Cited

PUBLICATIONS

MacIntosh System Software (Trademark of Apple Computer, Inc.) 1988 pp. 86–87.
Microsoft Windows User's Guide (Trademark of Microsoft Incorporation), 1990, pp. 89–92, 113.
Microsoft Windows User's Guide (Trademark of Microsoft Cor.) pp. 17, 25, 93–97, 444–474, 562–563.

*Primary Examiner*—Heather R. Herndon
*Assistant Examiner*—Cliff Nguyen Vo
*Attorney, Agent, or Firm*—Bruce D. Jobse; Andrew J. Dillon

[57] ABSTRACT

Programs written for an action oriented graphic user interface are transferred to an object oriented graphic user interface. Upon installation of a program the data file types cognizable to the program are recovered from an association table for the program. A template is generated for each data file type and an icon is set on each template. Each template is then placed into an associated templates folder.

8 Claims, 17 Drawing Sheets

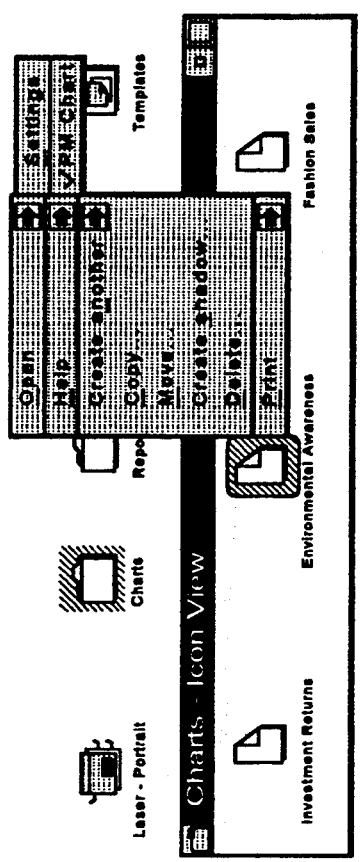
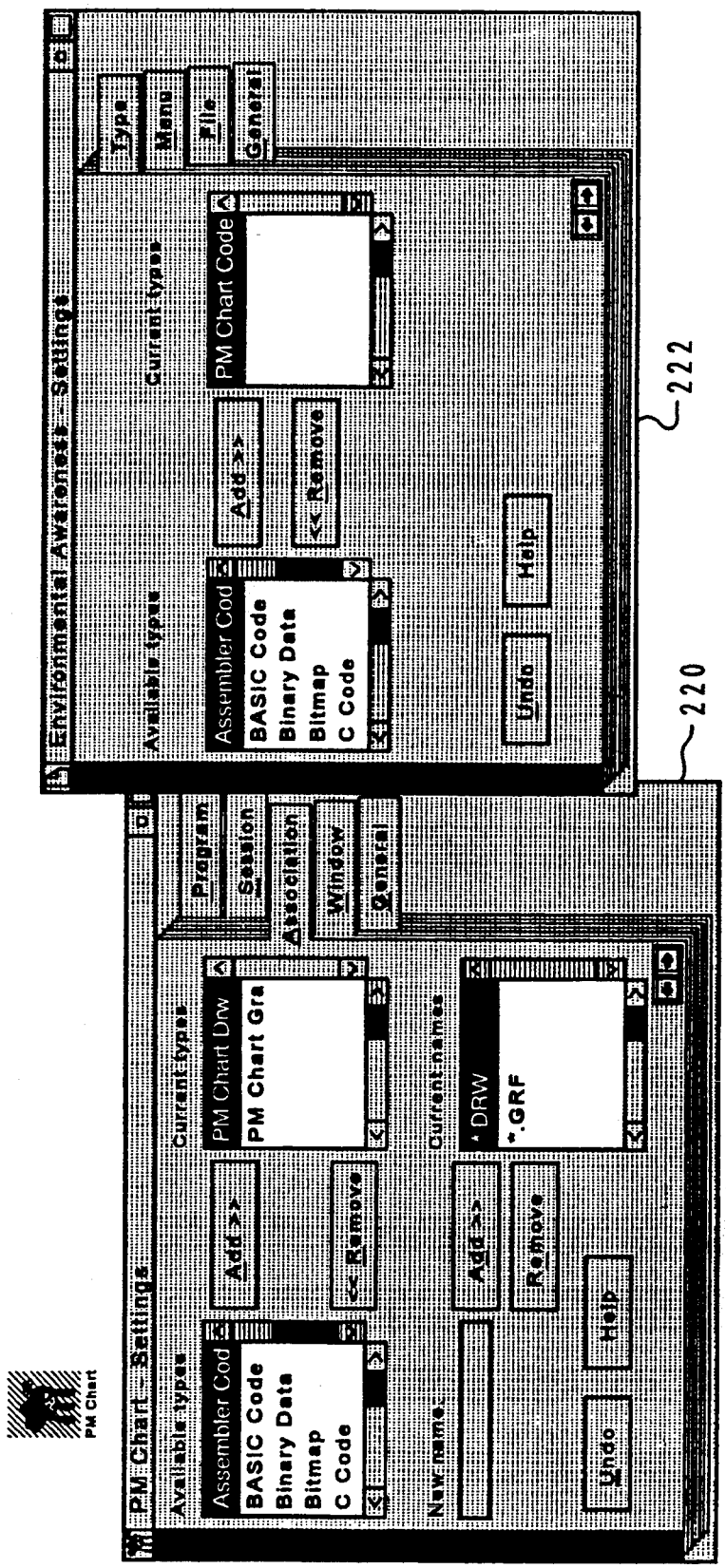
Fig. 18

METHOD OF TRANSFERRING PROGRAMS FROM ACTION ORIENTED GUI PARADIGM TO OBJECT ORIENTED GUI PARADIGM

This is a continuation of application Ser. No. 07/996,422, filed 23 Dec. 1992, now abandoned.

BACKGROUND OF THE INVENTION

1. Cross-Reference to Related Applications

The present patent application is one of a group of copending applications which concern the same overall personal computer system but which individually claim different inventive concepts embodied in such personal computer system. These related patent applications are specifically incorporated by reference herein, and are more particularly described as follows:

(1) Application Ser. No. 07/854,171, entitled "Method for Providing Conditional Cascading in a Computer System", the inventors being Bloomfield et al.;

(2) Application Ser. No. 07/854,257, entitled "Method for Providing Size Adjustment for a Maximized Window in a Computer System Graphical User Interface", the inventor being Bloomfield;

(3) Application Ser. No. 07/855,369, entitled "Palette Manager In A Graphical User Interface Computer System", the inventors being Bloomfield et al.;

(4) Application Ser. No. 07/996,983, U.S. Pat. No. 5,345,550, entitled "User-Modifiable Popup Menus For Object Oriented Behavior", the inventor being Bloomfield;

(5) Application Ser. No. 07/996,223, entitled "Method Of Generating A Hierarchical Window List In A Graphical User Interface", the inventors being Bloomfield et al.;

(6) Application Ser. No. 07/993,875, entitled "Apparatus And Method For Manipulating An Object In A Computer System Graphical User Interface" now abandoned, the inventors being Bloomfield et al.; and (7) Application Ser. No. 07/855,366, entitled "Method For Providing A Readily Distinguishable Template And Means Of Duplication Thereof In A Computer System Graphical User Interface" filed 20 Mar. 1992, the inventors being Bloomfield et al.

1. Technical Field

This invention relates to personal computer systems and in particular to a method and device for improving a graphical user interface (GUI) on a personal computer system.

2. Description of the Related Art

Personal computer systems in general and IBM personal computers in particular have attained widespread use in contemporary society. Personal computer systems can usually be defined as a desktop, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95. Beginning with the earliest personal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes, small memory size (12 Kbyte) and reasonable performance. DOS served well for the Family I machines and even into the basic Family II models, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufactures have investigated and used other types of GUI systems. One of the earliest in the personal computing area was Xerox's STAR system that presented the user with icons representing a particular operation or software application. Later, APPLE's Macintosh system added features such as windows and drag and drop to further the intuitive nature of the graphical user interface for APPLE's line of computers. Presently, MICROSOFT's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such as icons, which are graphical representations of various modules such as disk drives, applications and documents, or windows, which are rectangular areas on the screen in which applications or documents can be viewed, may be manipulated using the mouse. In this way, the underlying devices which the elements represent may be controlled.

As GUI systems developed, producing the underlying elements such as windows and icons has become well known. In fact, publicly available tools such as icon and window editors are now available to actually create the visual display. For example, Conklin, OS/2 Notebook, (Microsoft Press, 1990) pp. 159-255 discusses OS/2 software tools.

As new models of the personal computer family have been introduced, enhancement of the OS/2 operating system has become possible. One of the major features of the OS/2 Version 2.0 operating system is a workplace shell featuring a desktop metaphor. Briefly, the desktop metaphor presents the user with the look of a desktop. Devices such as a modem or printer are represented by icons. Computer files can appear as icons grouped together into folders. Folders can be placed into a predefined space such as a window. Application programs appear as unique icons that can be activated when a pointer, positioned by the movement of a mouse over the icon, is energized usually by double clicking one of the mouse buttons.

Applications are the programs that apply to the computer user's work, such as inventory control or document authorship. They are executable files (distinguished here from data files) and include programs for word processing and individual applications. Applications represent actions to be taken with respect to something else. For example, a word processing program is a tool for editing a data file which contains a document. The application permits the user to open the document and change its contents, but representation of the application as an icon is in effect making something which is abstract to the user into something concrete. It would be more intuitive to most users simply to open the document. Representing applications in the desk top metaphor makes the interface action oriented as opposed to an object oriented. Introducing action oriented graphics to the desktop metaphor is inconsistent with that metaphor, and can be counter intuitive to the user.

An office worker typically is interested in the things made using applications, not in the applications themselves. Thus practical problems confront a user when aspects of the graphical user interface become action oriented. First, a user must go to a separate application for each new action taken on a user data file. Because of this, the flow of the user's work on a user data file is interrupted while the user looks for applications to employ on the user data file and directs the computer to begin execution of the application.

While the advantages of an object oriented graphic user interface have been recognized for several years, its introduction to personal computers has been limited by the marketing advantages to an operating system vendor in not introducing an operating system incompatible with a large number of existing application programs. Many application vendors have gone to great expense in producing and marketing programs adapted for the mixed object-action metaphor. It is important for the operating system vendor to adapt the presentation layer provided with its operating system to existing applications and simultaneously eliminate the inconsistencies in presentation currently seen by users of Microsoft's Windows and IBM's Presentation Manager.

There is a need to allow use of application programs written for contemporary action-oriented presentation models with an object oriented graphic user interface. It is best if this method works with most if not all existing applications, and that the method be transparent to the end user. It would also be advantageous if no burden or complication be placed on developers of application programs. All new or old applications on a system should behave in a similar manner in the interface.

SUMMARY OF THE INVENTION

One object of the present invention is to provide a method of providing a consistent object oriented graphical user interface for a computer.

Another objective of the present invention is to provide for ease of use of a graphical user interface.

Yet another objective of the present invention is to provide a method to allow use of application programs written for contemporary action-oriented presentation models with an object oriented graphic user interface.

In accordance with one embodiment of the present invention, a graphical user interface for a data processing system includes a method of transferring programs written for an action oriented graphic user interface to an object oriented graphic user interface. Upon installation of a program the data file types cognizable to the program are recovered from an association table for the program. A template is generated for each data file type and an icon is set on each template. Each template is then placed into an associated templates folder.

BRIEF DESCRIPTION OF THE DRAWINGS

The foreground aspects and other features of the present invention are explained in the following written description, taken in connection with the accompanying drawings, wherein:

FIG. 18 is a screen representation of opened settings windows used for presenting association table extended attribute data for files.

DETAILED DESCRIPTION OF THE INVENTION

The following detailed description is of the best presently contemplated mode for carrying out the invention. This description is not to be taken in a limiting sense but is made merely for the purpose of illustrating the general principles of the invention since the scope of the invention is best defined by the appending claims.

I. Operation Of The Computer System—User's Perspective

Figure 1:
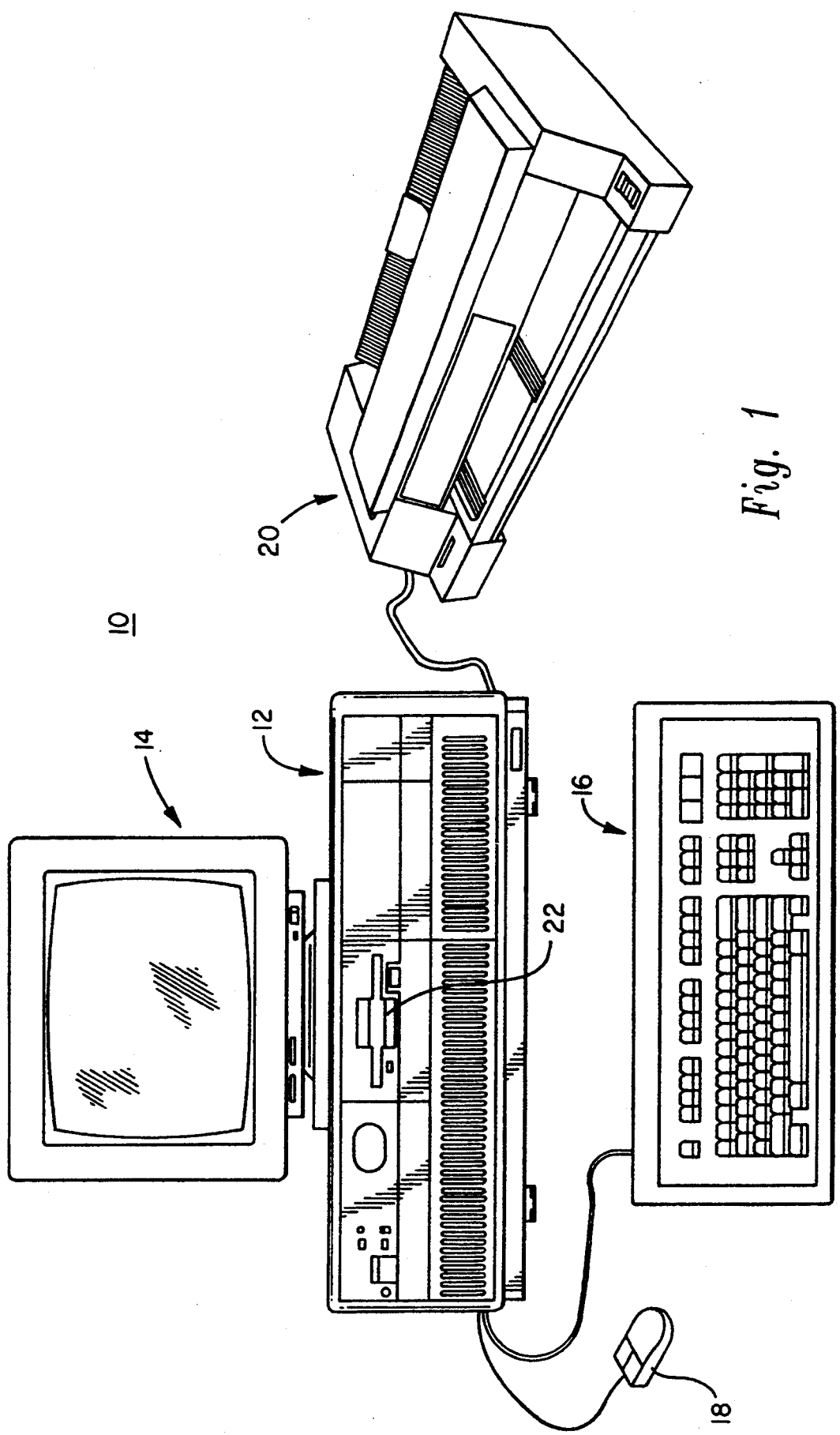
FIG. 1 shows a personal computer system in which the present invention can be employed.

Prior to relating the methodology and structure of the present invention, a summary of the operation in general of a typical personal computer system may merit review. Referring now to the drawings, and in particular to FIG. 1, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a BIOS interface between the I/O devices and the operating system. BIOS, which can be stored in a ROM on a motherboard or planar, includes diagnostic routines which are contained in a power on self test section referred to as POST.

II. Organization of the Computer System

Figure 2:
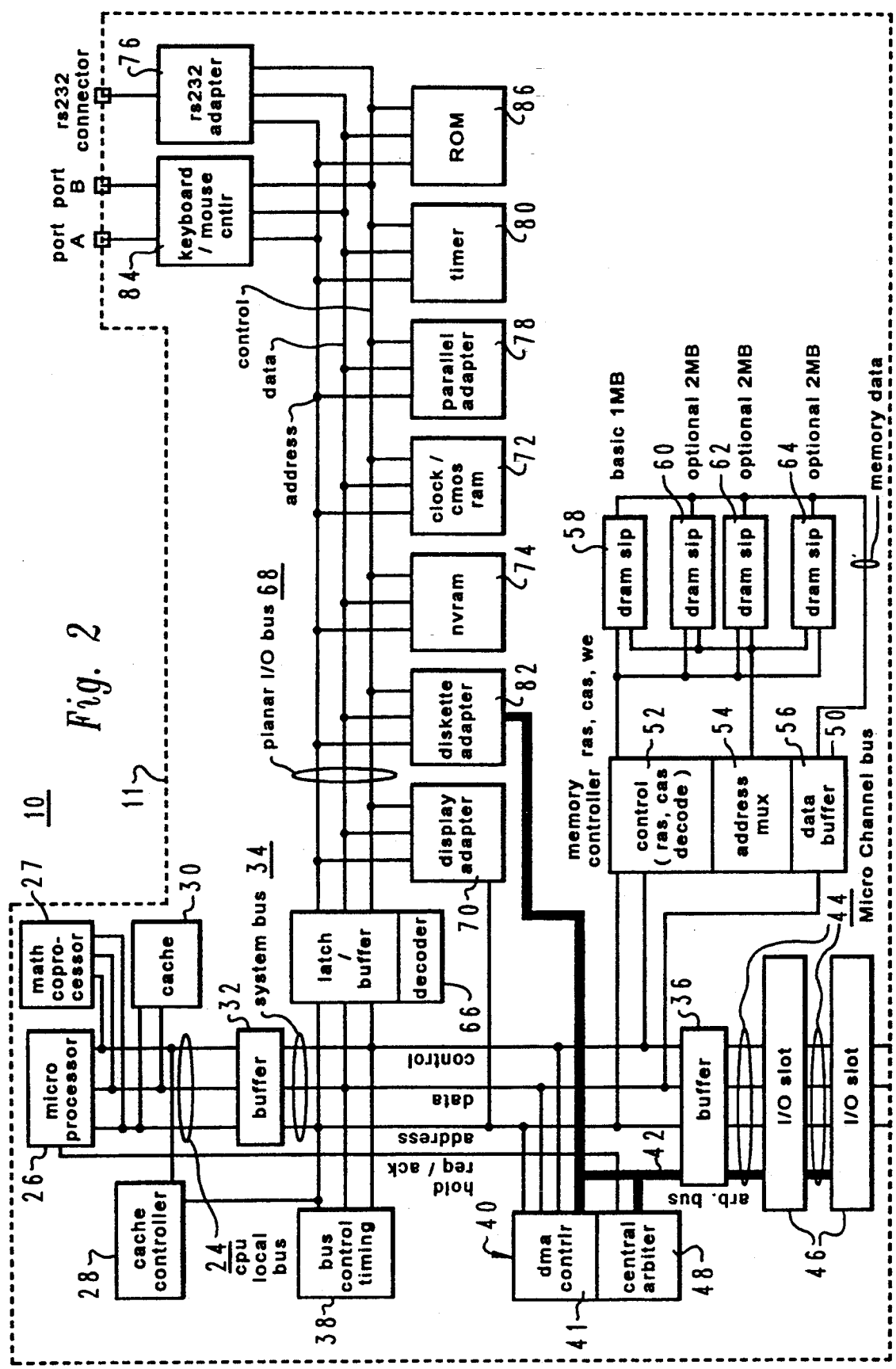
FIG. 2 shows a system block diagram for the personal computer system of FIG. 1.

Prior to relating the above structure to the present invention, a summary of the operation in general of the Personal Computer System 10 may merit review. Referring to FIG. 2, there is shown a block diagram of the Personal Computer System 10 illustrating the various components of the Computer System 10 in accordance with the present invention. FIG. 2 further illustrates components of the planar 11 and the connection of the planar 11 to the I/O slots 46 and other hardware of the Personal Computer System 10. Connected to the planar 11 is the system central processing unit (CPU) 26 comprised of a microprocessor which is connected by a high speed Central Processing Unit CPU local bus 24 through a bus controlled timing unit 38 to a memory control unit 50 which is further connected to a volatile random access memory (RAM) 58. While any appropriate microprocessor can be used for CPU 26, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80486 microprocessor. There particular microprocessors can operate in a real addressing mode or a protected addressing mode. Each mode provides an addressing scheme for accessing different areas of the microprocessor's memory.

Returning now to FIG. 2, the CPU local bus 24 (comprising data, address and control components) provides for the connection of 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a Direct Memory Access (DMA) unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexor 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

III. OS/2 Version 2 Operating System—Graphical User Interface

Figure 3:
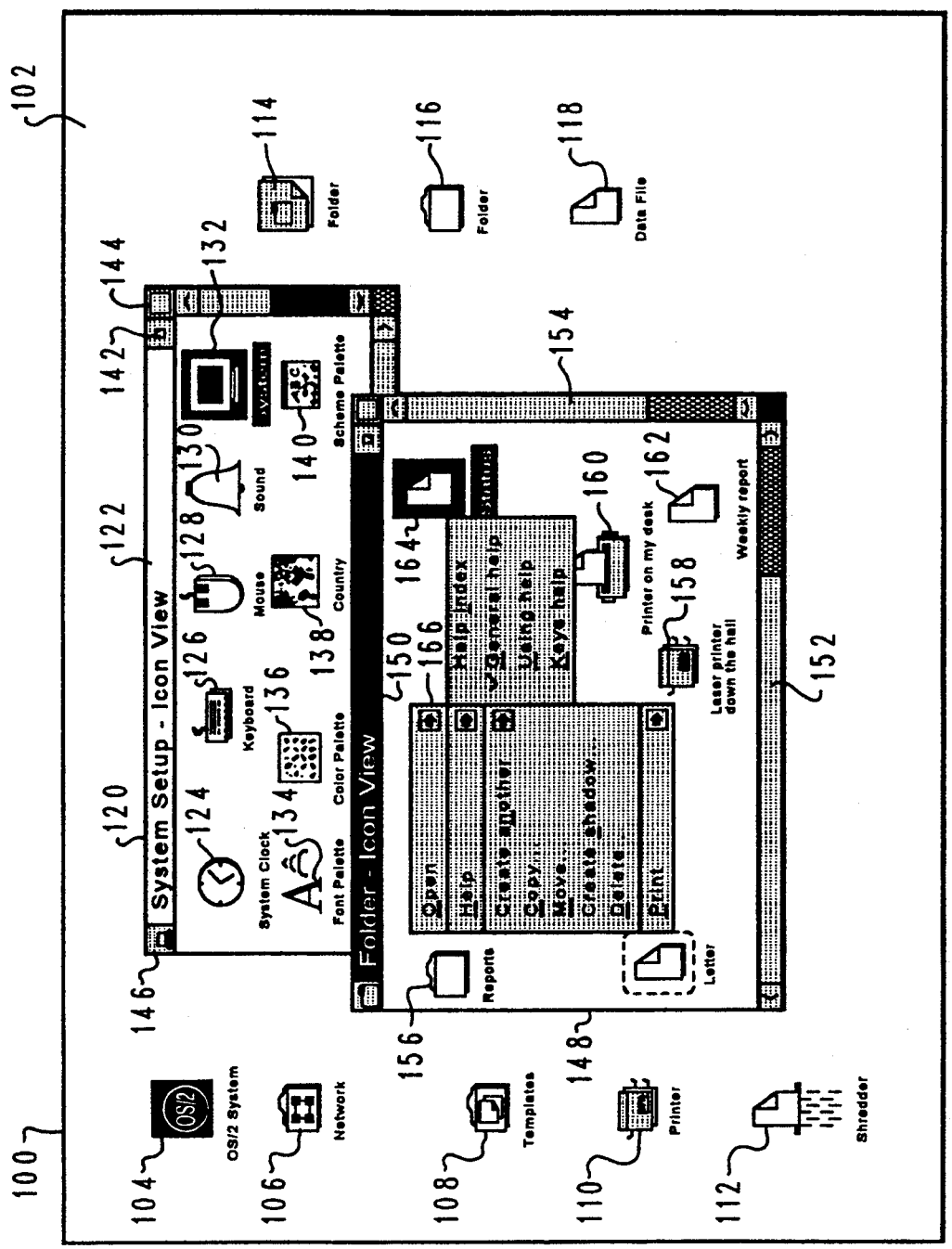
FIG. 3 is a screen representation of the desktop metaphor employed in the present invention.

It may be appropriate at this point to briefly review selected features of the OS/2 version 2.0 GUI. FIG. 3 illustrates a typical display screen 100 which appears when using the OS/2 version 2.0 operating system. The viewing area within screen 100 is referred to as desktop 102. Desktop 102 includes a plurality of user selectable icons which are conveniently selected by double clicking the left button of the mouse. Each icon represents an application, function or file storage area which the user can select. For example, as seen in FIG. 3, desktop 102 includes an OS/2 System icon 104, a Network icon 106, a Templates icon 108, a Printer icon 110, a Shredder icon 112, a Folder icon 114, another Folder icon 116 and a Data file 118.

When the user selects an icon by double clicking the same, the corresponding function is activated and the icon becomes highlighted. For example, when the OS/2 System icon 104 is selected on desktop 102, OS/2 System icon 104 becomes highlighted as illustrated in FIG. 3. When OS/2 System icon 102 is so selected, a corresponding window 120 of further possible selections is displayed on desktop 102. More specifically, window 120 includes a title bar 122 in which the name of the selected window is designated in text as "System Setup—Icon View". In this particular example, the selectable icons appearing within System Startup window 120 includes a System Clock icon 124, a Keyboard icon 126, a Mouse icon 128, a Sound icon 130, a System icon 132, a Font Palette icon 134, a Color Palette 136, a Country icon 138 and Scheme Palette 140.

The upper right corner of window 120 includes a small box 142 which, if selected by the user, minimizes window 120, thus dismissing window 120 and returning window 120 to the icon 104 representation thereof. The upper right corner of window 120 also includes a box 144, larger than box 142 and which is selected by the user, maximizes window 120, thus causing window 120 to occupy substantially all of desktop 102.

The icon representation 146 appearing in the upper left corner indicates the type of window to which it corresponds. For example, window 120 is a system setup window; accordingly, the icon appearing in the upper left corner of window 120 is representative of the System icon. Had system clock icon 124 been selected, the icon appearing in the upper left corner of its window would be representative of a clock.

Since title bar 122 of window 120 is depicted in white or "not-highlighted", this indicates the window 120 is not presently selected or active. Rather the user has clicked on and selected Folder 114 as indicated by its highlighted nature. When Folder 114 was so selected, a corresponding Folder window 148 was opened on desktop 102 in overlapping fashion with respect to the earlier opened System Setup window 120. The title bar 150 of window 148 indicates the title of window 148 as being "Folder-Icon View". It is noted that title bar 150 of window 148 is highlighted, thus indicating that window 148 is presently the active window.

Window 148 includes a horizontal scroll bar 152 which can be engaged by the user to scroll through the contents of window 148 from left to right and from right to left all within the particular viewing area defined by the chosen dimensions of window 148. Window 148 also includes a vertical scroll bar for scrolling through the window contents vertically. Other windows generated by the operating system also include this feature. For purposes of example, window 148 includes a Reports icon 156, a Laser Printer Down The Hall icon 158, a Printer On My Desk icon 160, a Weekly Report icon 162 and a Status icon 164.

IV. OS/2 Version 2.0 Operating System—File System Architecture

The disk operating system (DOS) supplied with first generation IBM personal computers allocated space on a disk storage device through a file allocation table (FAT). Access to the FAT using a file name allows the computer to recover addresses for all sectors used to store a file. This association of a file name with sectors defines two attributes of a file, its name and address. The DOS directory structure allowed definition of further file attributes including, directory membership, creation or last revision date and size. The file allocation table and the directory structure are physically distinct from user files and are kept at fixed locations on a disk so that the computer need not look up an address to access file attributes.

DOS based graphical user interfaces such as the Microsoft Windows system, and the Presentation Manager graphical user interface based on the IBM OS/2 operating system have ways to determine which data files are related to particular programs. Application programs were designed to supply extended attributes into association tables accessible to the operating system. These tables specify data file types cognizable by the program, a title for the data file types and an icon to represent the program in the GUI. The association table for a program would include a file name filter (i.e. a standard DOS file name extension to attach to user data files created using the program) and the icon. Extended attributes may be accessed, in an OS/2 operating environment, without opening a file. The present invention uses the information present in the association tables for such action oriented paradigm application to make the graphic user interface compatible with an object oriented paradigm.

Through extended attributes for an object, the OS/2 version 2.0 operating system allows an object to maintain a list of actions (i.e. applications) which can be performed on the object. This list is presented to a user in an object specific pop up menu. In the OS/2 operating system an object can be any passive entity that contains or receives data, for example, blocks, fields, files, directories, displays, keyboards, network nodes, pages and printers.

V. Presentation of Template Objects

Figure 4:
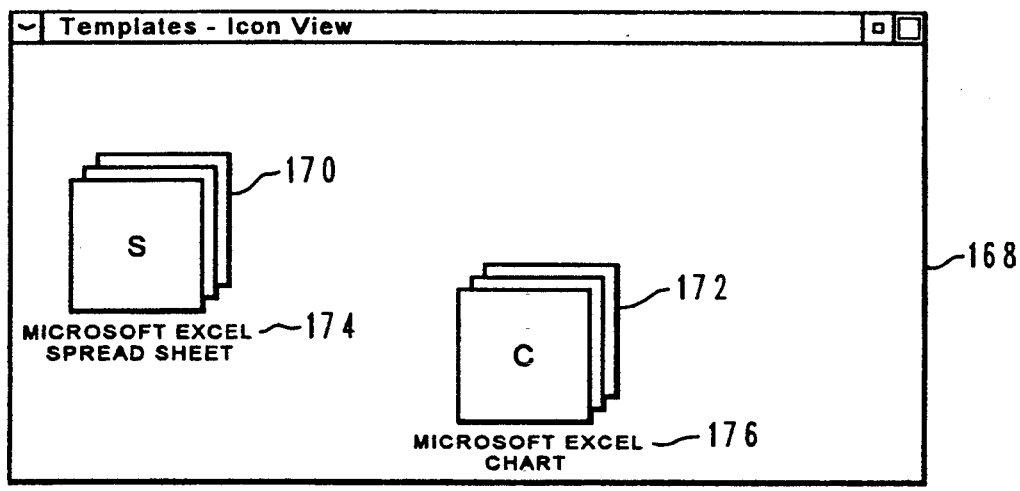
FIG. 4 is a screen representative of an opened templates folder for a graphical user interface.

FIG. 4 illustrates a window 168 entitled "Templates—Icon View" which may be opened on a display screen. In creating window 168, the association table for each action oriented paradigm application program is retrieved. For each data file type identified in the association table, a template object is created in the system templates folder. For the Microsoft Excel example depicted these include a spreadsheet template icon 170 and a chart template icon 172. Templates may be regarded at inchoate documents, accessed instead of a document actually associated with a user data file in system storage. They have some attributes of a document though, such as iconic representation, a data file type and possibly default formatting information. Templates are akin to blank graph paper or unused stationary laying on the desktop. Fully descriptive titles 174 and 176 for the template icons are provided from the association tables. Icons 170 and 172 appear as a mini-icon superimposed on top of a standard template stack icon, representing a potential plurality of type instances. A template is automatically made, in the standard templates folder, for each program file existing on personal computer or workstation for each program file installed on the computer in addition to program that is installed subsequently as is specified below with reference to FIG. 20.

Figure 5:
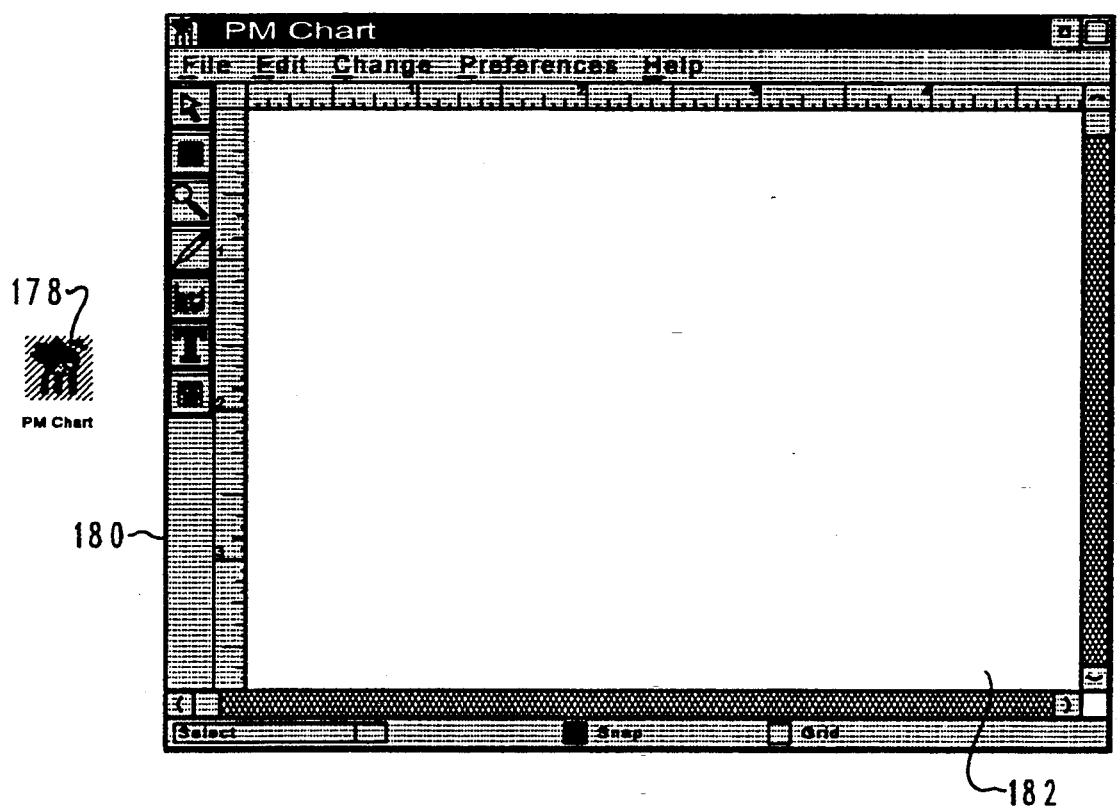
FIG. 5 is a screen representation of a prior art graphical user interface into which a document editor has been opened.

FIG. 5 illustrates the prior art presentation screen for the process of creating a new document in an action oriented graphic user interface. A user first selects an action, here a document editor application program called PM Chart, represented by an icon 178. This is done by the user moving a pointer to icon 178 and "double clicking" on the icon to select the underlying program. The computer responds to these acts by opening and presenting the user with an editing window 180, which comes up with an empty entry field 182.

Figure 6:
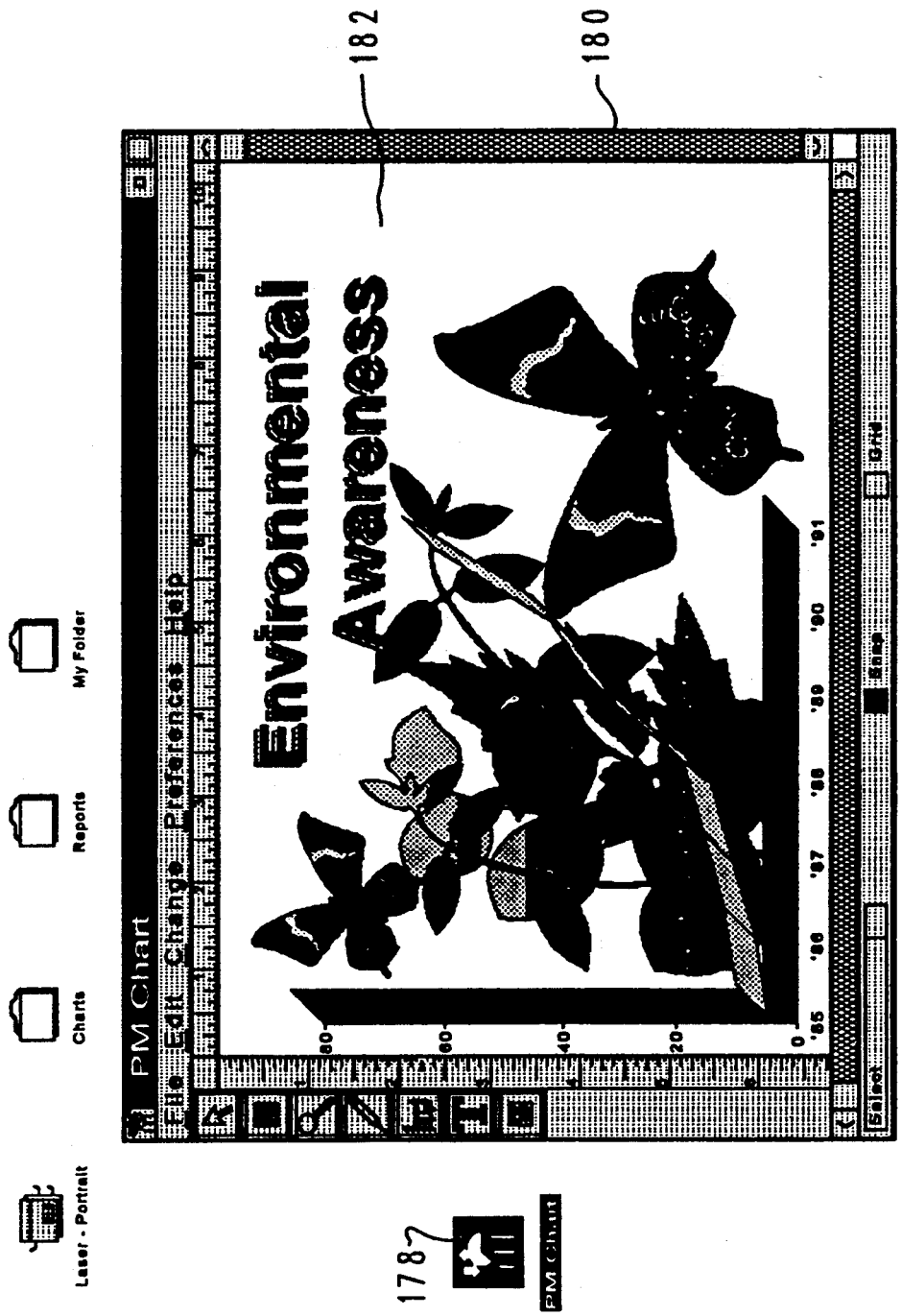
FIG. 6 is a screen representation of a target object in the document editor of FIG. 5.

FIG. 6 illustrates a second step of generation of a new document, where the user has entered data into field 182 constituting a new document. Icon 178 is highlighted to indicate its correspondence to an opened window.

Figure 7:
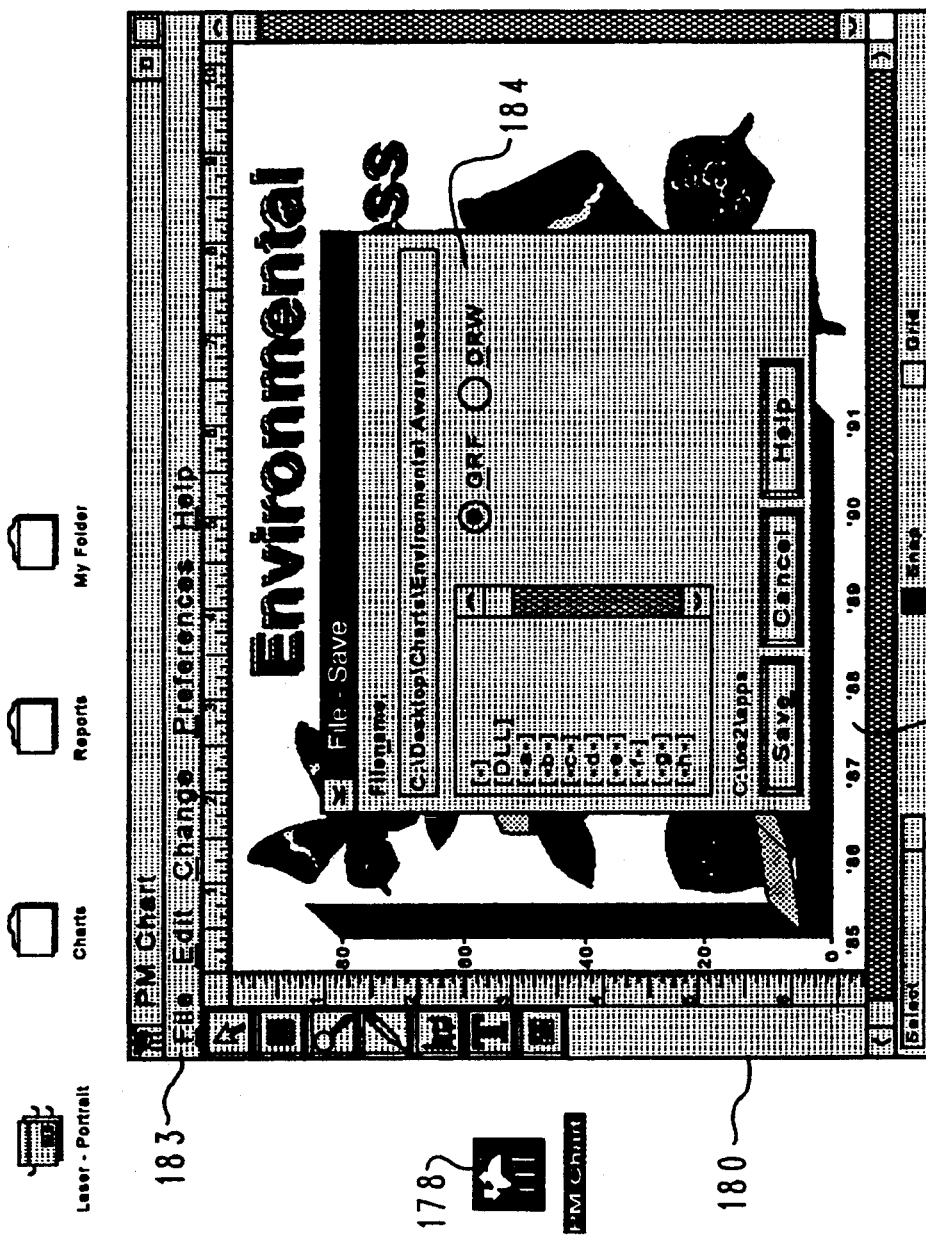
FIG. 7 is a screen representation of a document definition menu opened into the document editor window of FIG. 5.

FIG. 7 illustrates the last step in the creation of a document, which is generation of a user file to store the document. From the window menu bar 183 the user may select an operation. Here the "File" item has been selected resulting in display of a pull down menu 184 appearing within entry field 182. Since the entire process has up to this point been action oriented, the target data object made within entry field 182 has been undefined. The "Save" action may be selected and a file name entered to define a file corresponding to the target data object.

Figure 8:
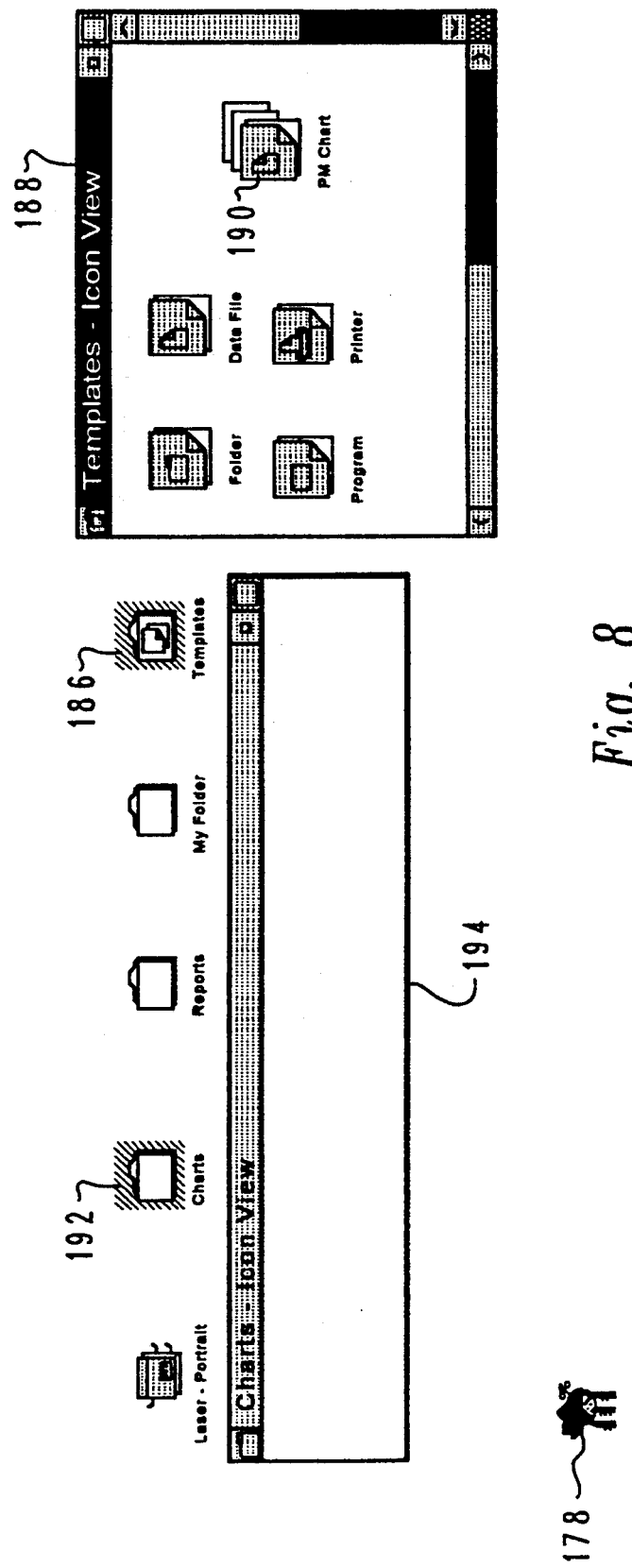
FIG. 8 is a screen representation of an object oriented graphical user interface.

FIG. 8 illustrates a conventional action-oriented program presented in an object oriented manner. To create a new chart document from an object oriented interface, the user selects templates icon 186 which results in a window 188 being opened. Within the display field of window 188 are a number of icons including a PM Chart template stack icon 190. The user drags (a mouse direct manipulation technique) an icon instance off of stack icon 190. The destination for the icon instance is a window 194 entitled "Charts—Icon View" opened by selection of a Charts icon 192.

Figure 9:
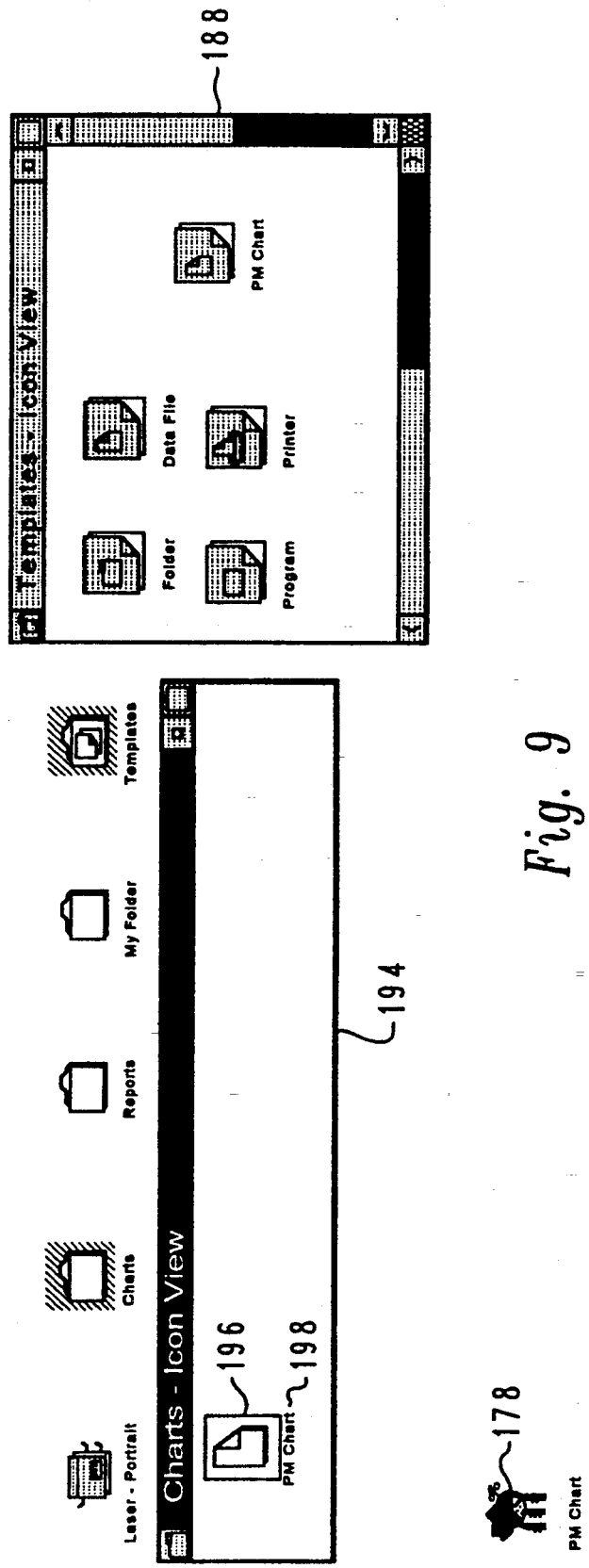
FIG. 9 is a screen representation of use of an object oriented graphical user interface.
Figure 10:
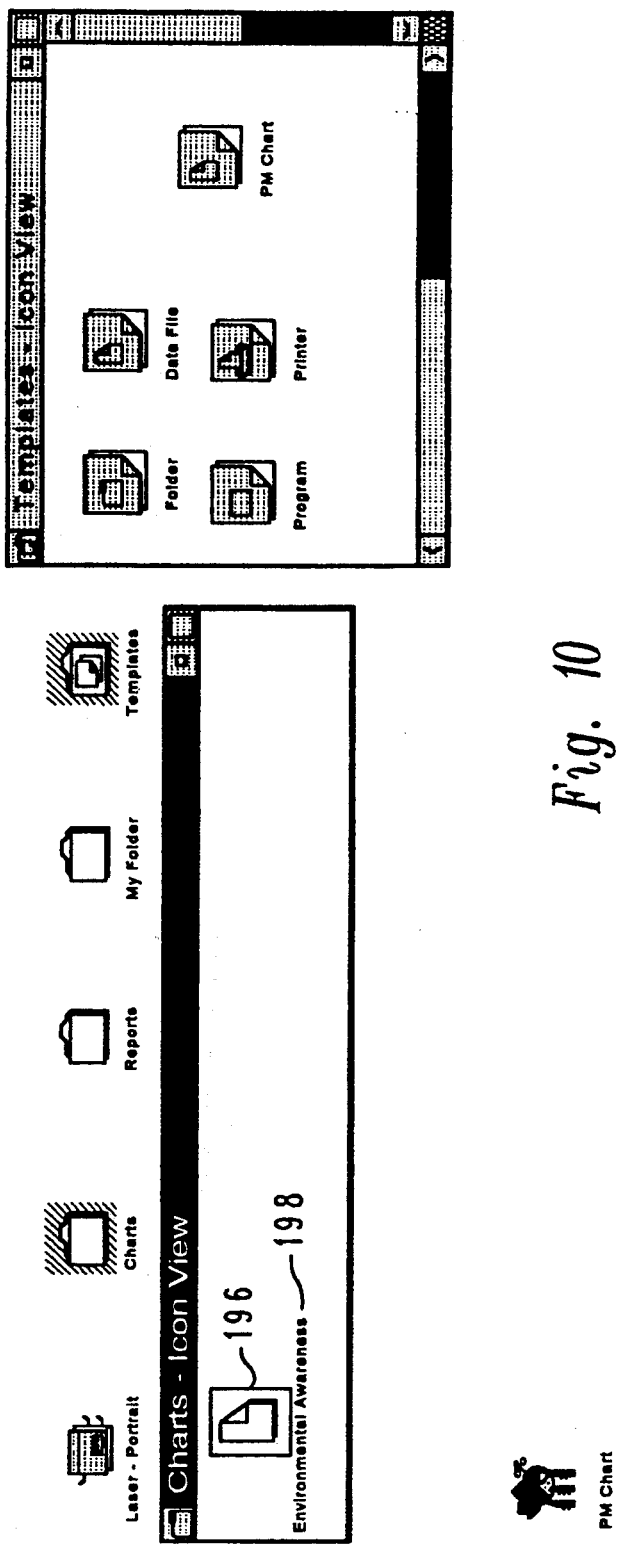
FIG. 10 is a screen representation of use of an object oriented graphical user interface.

FIG. 9 shows the new chart document that was created by depositing a template instance icon 196 into the display field of window 194. The new instance automatically assumes an icon specified in an association table for the PM Chart application and a title 198 specified by the application. In FIG. 10 the title 198 has been changed on the user's initiative.

Figure 11:
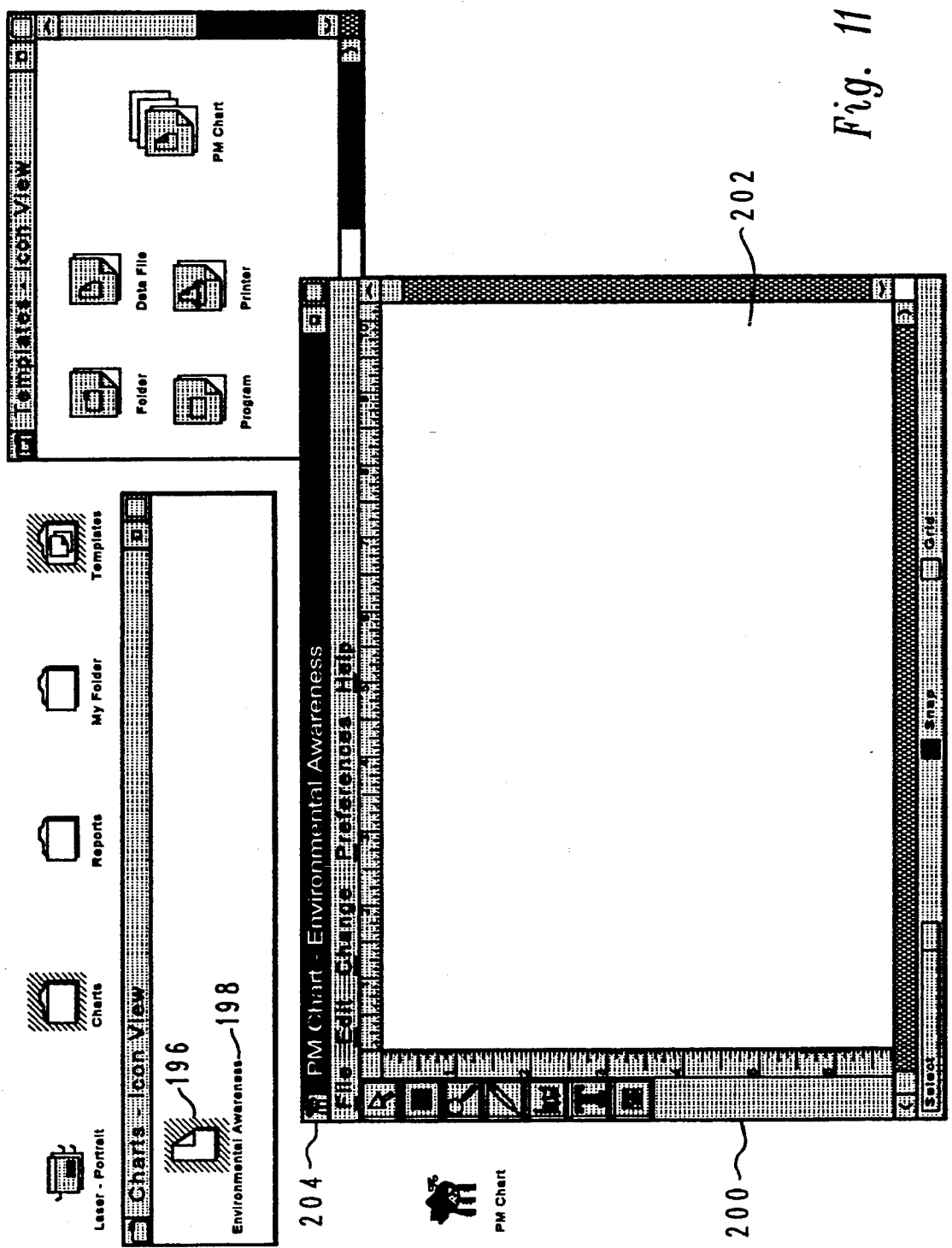
FIG. 11 is a screen representation of an editing window opened for an object in an object oriented graphical user interface.

FIG. 11 illustrates the result of the user selecting an action from the document represented by icon instance 196. The manner of making such selections is described below. The fundamental advantage of object oriented interfaces is that any action which may be performed on the object may be selected at this time through a pop up menu. Icon instance 196 becomes highlighted indicating a corresponding editing window 200 which has been opened for the document. This happens in response to selection of an "OPEN" operation from the pop up menu or by a fast path of "double clicking" the mouse selection button with the pointer on icon instance 196. The entry field 202 of window 200 comes up empty since the document has just been created but the title bar 204 carries the title "PM Chart Environmental—Awareness" corresponding to title 198. The user may now begin the entry or importation of information into the chart "Environmental Awareness".

Figure 12:
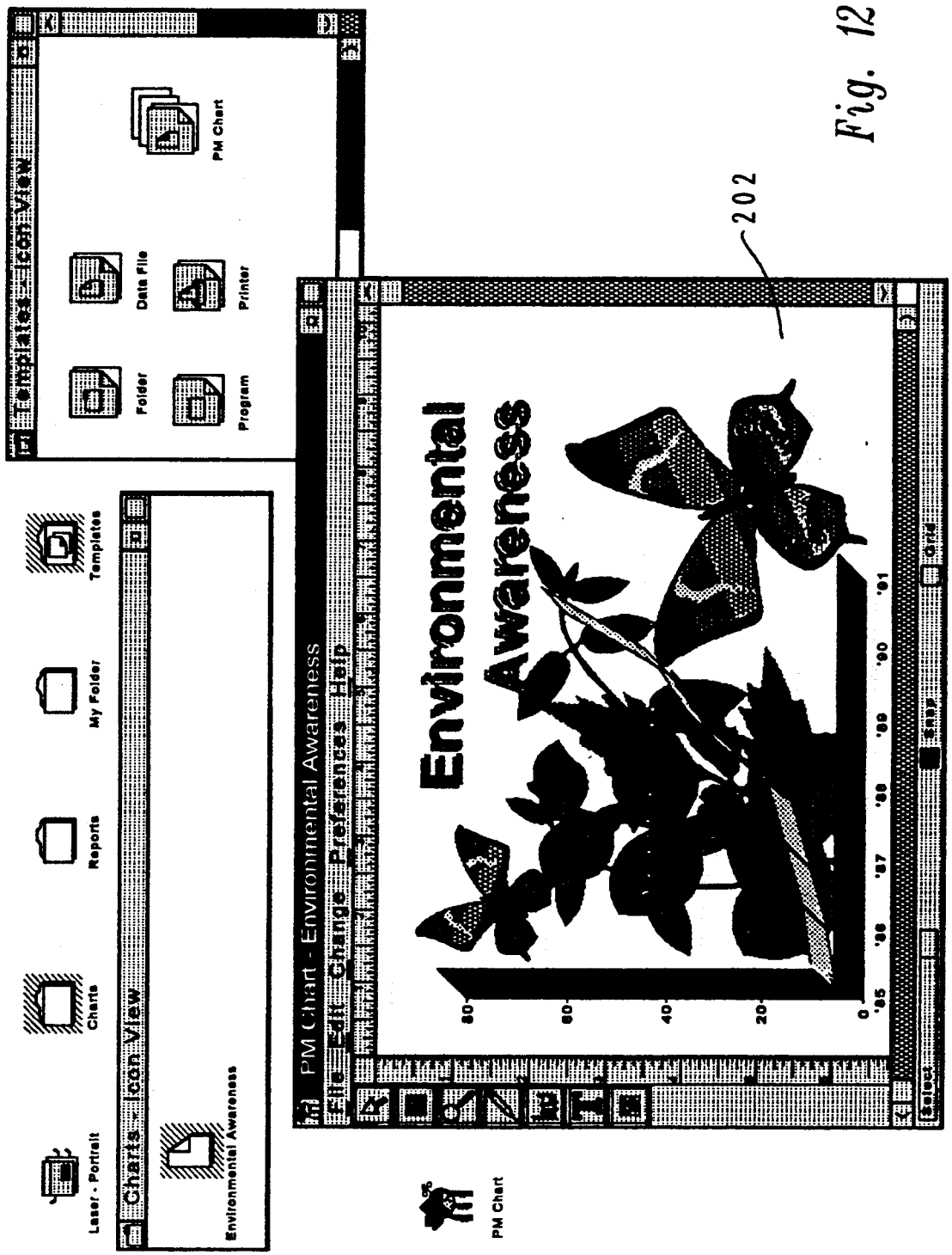
FIG. 12 is a screen representation of an editing window with data opened into an object oriented graphical user interface.

In FIG. 12 the desired data has been entered into entry field 202 in exactly the same manner as before. In an object oriented graphic user interface objects have persistent data and implement what is termed as perfect save. All changes and settings are continuously made persistent. Whatever state the data is in when window 200 is closed is the state the data will be saved in.

Figure 13:
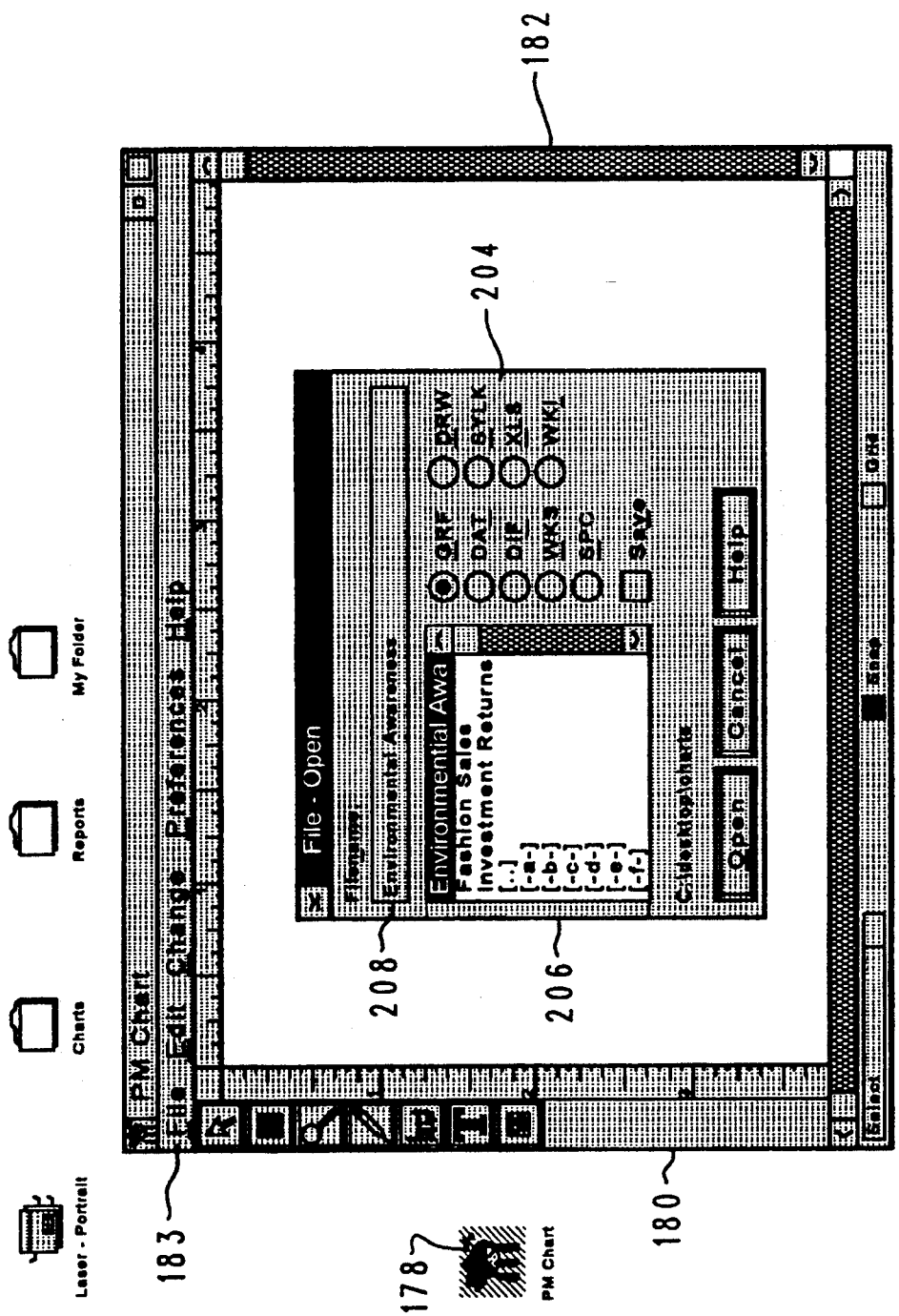
FIG. 13 is a screen representation of a prior art editing window for a program in an action oriented graphical user interface.
Figure 14:
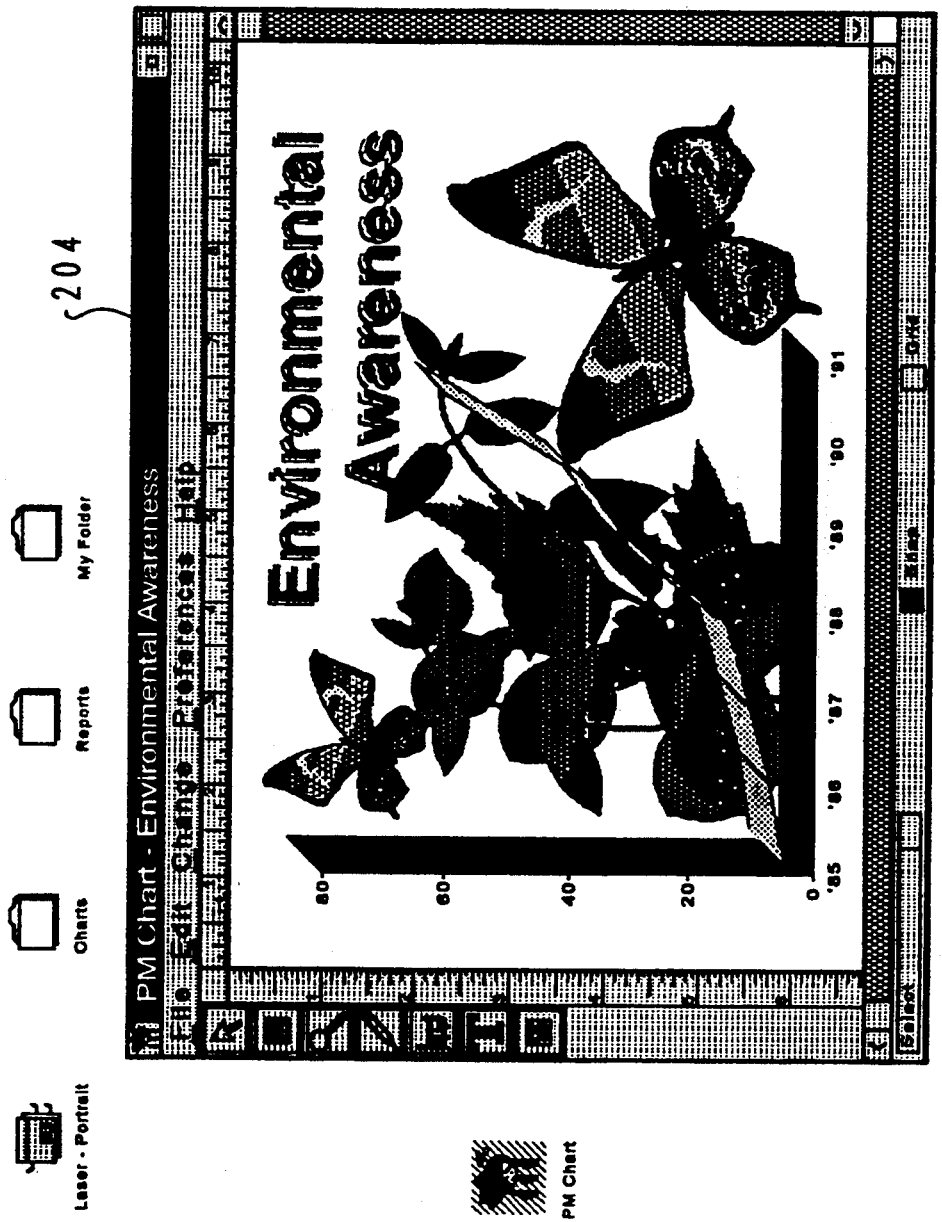
FIG. 14 is a screen representation illustrating recovery of an existing document into an action oriented interface.

FIGS. 5 and 13 illustrate retrieval of an existing document in an action oriented paradigm. After selecting an application program by direct manipulation on icon 178 to obtain an editing window 180, the file services item from menu bar 183 may be selected. From a pull down menu a file open item is selected, which results in a selection window 204 being opened. From window 204 the user hunts for the document by scrolling through names in a field 206 or by typing in the name of the document in field 208. At that point the user may open the document into field 182, cancel the request or select help. FIG. 14 shows the specified "Environmental Awareness" document, with the title of the document reproduced in title bar 204.

Figure 15:
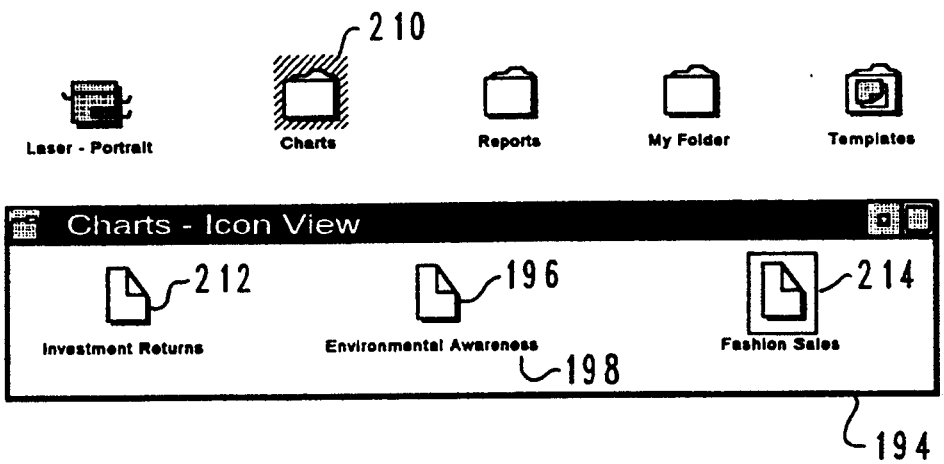
FIG. 15 is a screen representation of an object oriented interface.

The opening of an existing document in an object oriented interface is consistent with performing any other action on a document, but quite different from the procedures used in an action oriented interface. Instead of beginning with the icon for the document editor program and then searching from within the program for the desired document, the document is reached directly from the interface. In FIG. 15 the interface is depicted. A charts folder icon 210 has been selected to open window 194 in which the contents of the underlying folder are graphically depicted. The contents of the folder are user data files or documents, represented by icons 196, 212 and 214.

Figure 16:
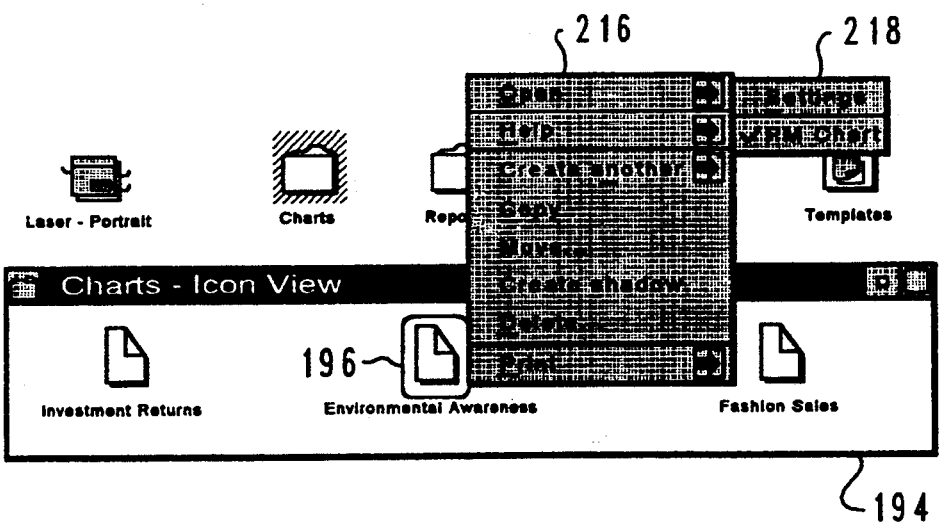
FIG. 16 is a screen representation of a pop up menu used with an object oriented interface.

FIG. 16 illustrates the process of opening an existing document. Icon 196 for the document "Environmental Awareness" has been selected by moving the mouse pointer to the icon. A pop up menu 216 has been opened by selecting the icon. All actions that can be performed on the document are itemized in pop up menu 216. Some action items in the list are cascaded submenu listings (Open, Help, Create another and Print), selection of which results in generation of a cascaded submenu 218 of action selections.

Figure 17:
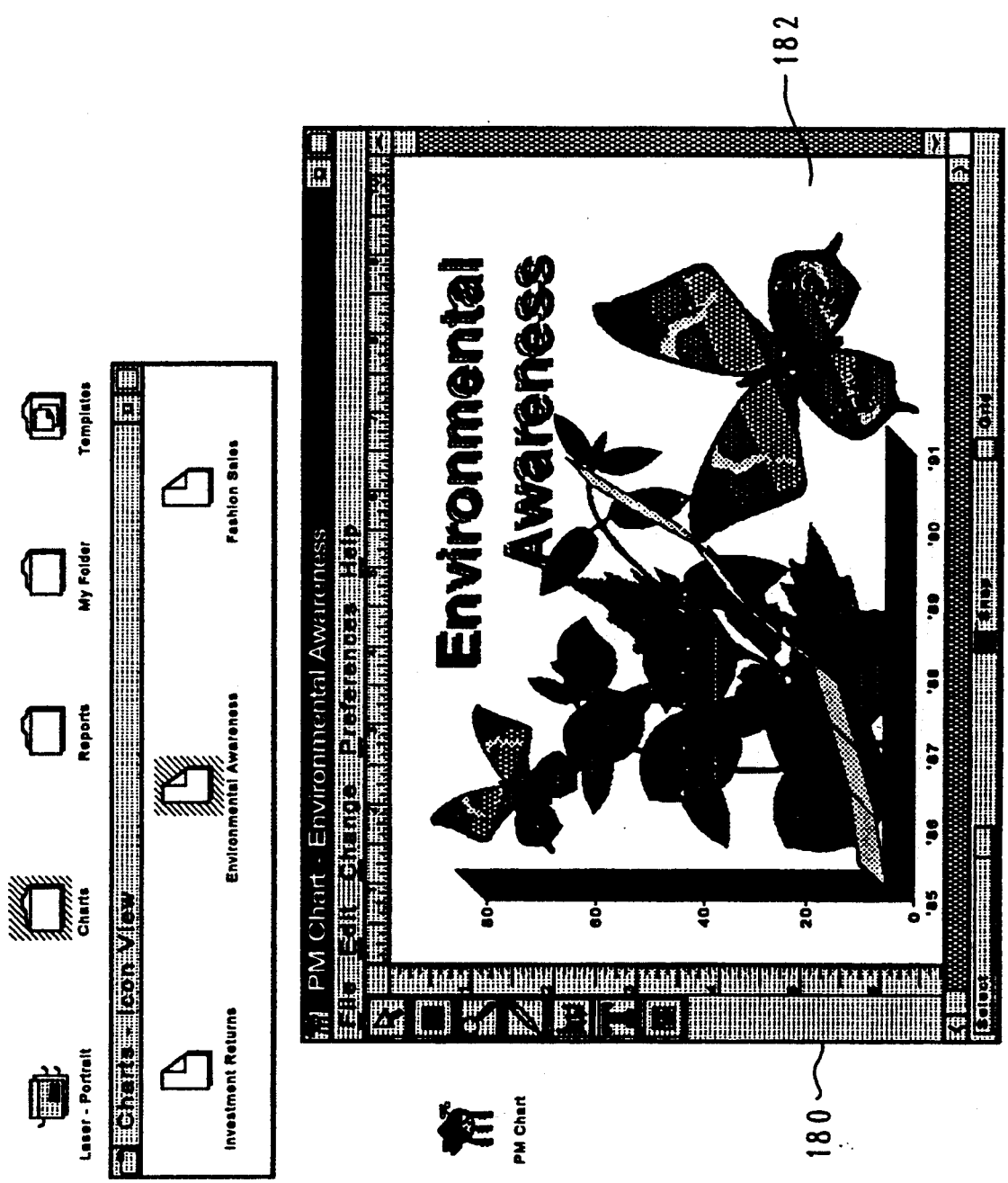
FIG. 17 is a screen representation of recovery of an existing document into an object oriented interface.

FIG. 17 illustrates the result of selecting the PM Chart item from within cascaded submenu 218. The document is opened with the conventional PM Chart editing window 180 being displayed with the contents of the current data file associated with the selected document already displayed in the entry field 182. The pop up menu and any dependent cascaded menus are suppressed after a selection.

FIG. 18 illustrates use of a settings window 220 for the PM Chart program and a settings window 222 opened for a document object, here the document "Environmental Awareness". From window 220, which depicts the contents of an association table for extended attributes, it can be seen that the PM Chart program is associated with document objects of the type "PM Chart Drawing" and "PM Chart Graph". These types of documents are identified by file extensions of ".DRW" and ".GRF", respectively, which are attached to a DOS compatible file name for the document upon its creation. These extensions are typically hidden from the user, who names the document using the broader name space provided with the High Performance File System. The document object settings window 222 shows that the document "Environmental Awareness" is of the type "PM Chart Graph" and thus an association is made. This allows the program to show up in an open pop up menu for the document object and establishes a default icon designated for the type in the PM Chart program through the program association table.

Figure 19:
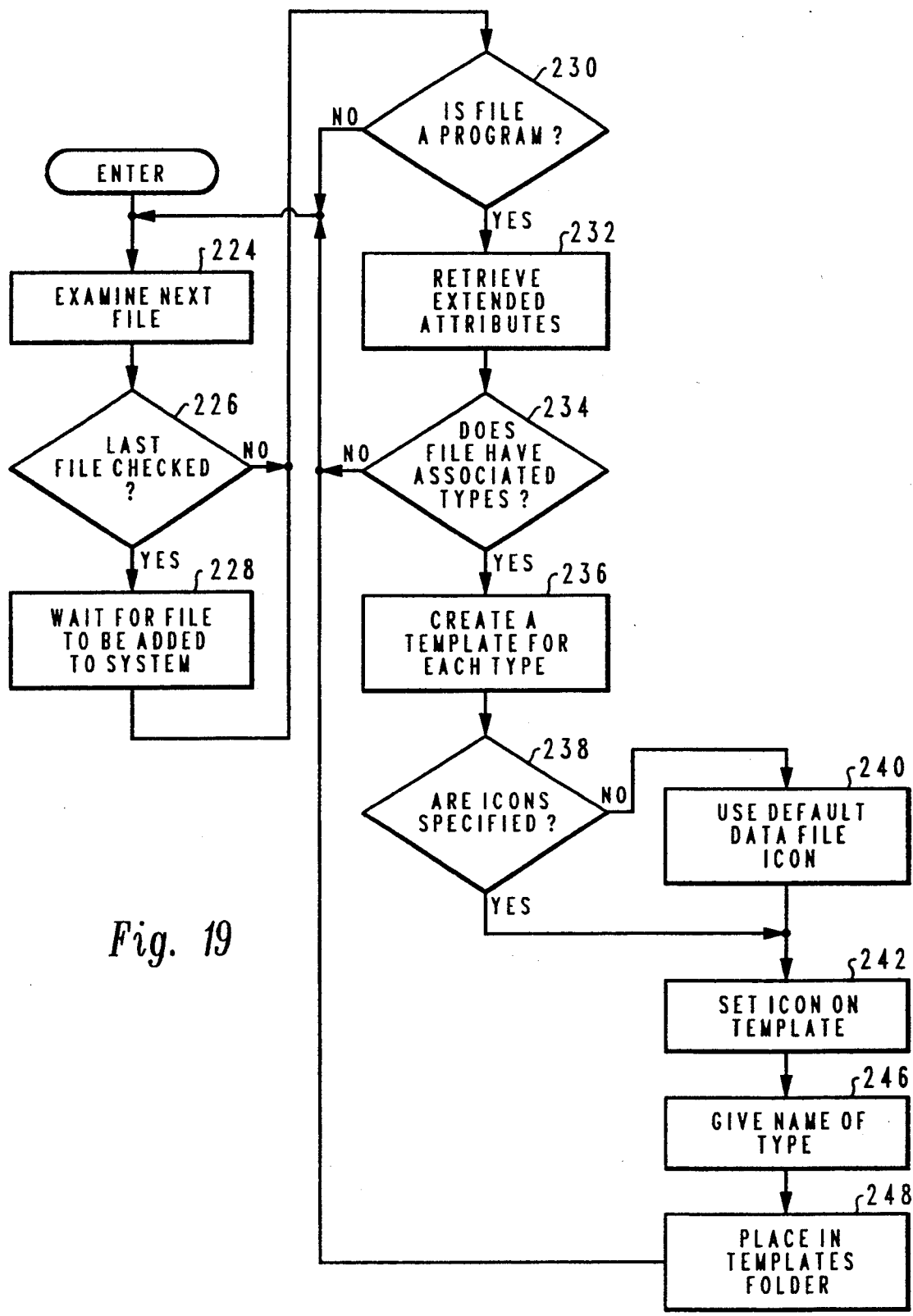
FIG. 19 is a flowchart depicting the operation of the method of the present invention.

FIG. 19 illustrates an endless loop process executed by an OS/2 operating system to support the features of the present invention. The process is entered upon installation of an upgrade of the operating system to a version including the routine. Step 224 is executed to retrieve and examine the extended attributes for the first (or next) file. If the last files has been checked (determined at step 226), the process follows the YES branch to step 228 where it waits for a file to be added to the system. Step 228 is entered directly upon system start up where the operating system has previously been installed.

The NO branch from step 226 advances processing to the substantive aspects of the program. Following the NO branch from step 226, or after step 228, step 230 is reached. At step 230 it is determined if the next (or added) file is a program. If it is not it is of no interest since it will not add an association table to the system. In that case the NO branch is followed back to step 224 to recover any other new files. If the file is a program file the association table for the program is retrieved (step 232). In step 234 the extended attributes from the association table are examined to determine if the program has any associated data file types. If the program is one written for use with an operating system having a graphical user interface such as Windows or Presentation Manager, such data file types are expected.

If the program does not have associated types processing returns to step 224 to recover the next file if any.

If the program has associated types a template is created for each type at step 236. Next, at step 238 the extended attributes are again examined to determine if the program specified icons for its associated data file types. If no icon is specified, the NO branch is taken from the step to step 240 where a default data file icon is added to the association table. After step 240, or following the NO branch from step 238, the icons are set in the template. Next, step 246 prompts the user to give the icon type(s) a name(s). Finally, step 248 places the template into a templates folder. Processing then returns to step to examine the next file.

While the invention has been particularly shown and described with reference to a preferred embodiment, it will be understood by those skilled in the art that various changes in form and detail may be made therein without departing from the spirit and scope of the invention.

What is claimed is:

1. A method of transferring an action paradigm program written for an action oriented graphic user interface to an object oriented graphic user interface comprising the steps of:
   supporting association tables with extended attributes for application programs and other objects through a high performance file system;
   recovering data file types cognizable to the action paradigm program from an association table for the action paradigm program;
   generating a template for each data file type;
   setting an inchoate document icon on each template;
   placing each template into an associated templates folder;
   for each data file type having an inchoate document icon in the object oriented graphic user interface, selecting applications for a displayable menu of applications usable with the data file type; and
   responsive to user selection on an inchoate document icon, creating a data file.

2. A method as set forth in claim 1, and further comprising the step of:
   suppressing display of any icon representing the action paradigm program.

3. A method as set forth in claim 2, and further comprising the steps of:
   prior to setting the inchoate document icon on each template, determining if the association table for a program specifies an icon for each cognizable data file type;
   if the determination is affirmative, using the specified icons in the setting step; and
   if the determination is negative, using a default icon in the setting step.

4. A method as set forth in claim 3, and further comprising:
   after installation of a program on a data processing system, determining if the program has an association table with extended attributes supporting an action paradigm user interface; and
   if the determination is affirmative, executing the method on the program.

5. A method as set forth in claim 3, and further comprising:
   upon installation of the method on a data processing system, executing the method on all action paradigm programs previously installed on the data processing system.

6. A data processing system for transferring programs written for an action oriented graphic user interface to an object oriented graphic user interface comprising:
- an object oriented graphic user interface;
- a high performance file system for supporting association tables for programs installed on the data processing system;
- means for recovering data file types cognizable to an action paradigm program from an association table for the action paradigm program;
- means for generating a template for each data file type;
- means for setting an icon on each template; and
- means for placing each template into an associated templates folder;
- means for selecting applications for a displayable menu of applications usable with each data file type having an icon in the object oriented graphic user interface; and
- means responsive to selection on an icon for generating a data file.

7. A data processing system as set forth in claim 6, and further comprising:
- means for determining if the association table for a program specifies an icon for each cognizable data file type;
- means responsive to an affirmative determination of presence of specified icons for passing the specified icons to the means for setting; and
- means responsive to a negative determination of presence of specified icons for passing a default icon in the means for setting.

8. A data processing system as set forth in claim 7, and further comprising:
- means responsive to installation of a program on the data processing system for determining if the program has an association table with extended attributes supporting an action paradigm user interface.

* * * * *